United States Patent [19]

Gates

[11] Patent Number: 5,766,316
[45] Date of Patent: Jun. 16, 1998

[54] ELECTRONIC DEVICE COOLING AIR FILTER AND METHOD THEREOF

[76] Inventor: Cassen L. Gates, 2820 State St., Saginaw, Mich. 48602

[21] Appl. No.: 742,657

[22] Filed: Nov. 4, 1996

Related U.S. Application Data

[60] Provisional application No. 60/018,051 May 21, 1996.

[51] Int. Cl.$^6$ .................................................. B01D 46/00
[52] U.S. Cl. ........................ 95/273; 55/385.6; 55/467; 55/491; 55/492; 55/500; 55/504
[58] Field of Search ................... 55/385.6, 385.7, 55/385.4, 385.1, 492, 490, 500, 501, 506, 505, 504, 510, 509, 491, DIG. 31, 467; 95/273; 454/184

[56] References Cited

U.S. PATENT DOCUMENTS

| | | | |
|---|---|---|---|
| D. 281,163 | 10/1985 | Robinson | D14/109 |
| 2,316,526 | 4/1943 | McDonald | 55/DIG. 31 |
| 3,031,826 | 5/1962 | Brimberg et al. | 55/492 |
| 3,912,473 | 10/1975 | Wilkins | 55/DIG. 31 |
| 3,971,877 | 7/1976 | Lee | 55/509 |
| 4,633,349 | 12/1986 | Beck et al. | 55/385.1 |
| 4,657,570 | 4/1987 | Gronholz et al. | 55/385.6 |
| 4,659,349 | 4/1987 | Rodi et al. | 55/385.4 |
| 4,889,542 | 12/1989 | Hayes | 55/97 |
| 5,163,870 | 11/1992 | Cooper | 454/184 |
| 5,223,006 | 6/1993 | Moran, III | 55/124 |
| 5,421,862 | 6/1995 | Davis | 55/491 |
| 5,431,974 | 7/1995 | Pierce | 55/385.4 |
| 5,462,569 | 10/1995 | Benjamin | 55/495 |
| 5,514,036 | 5/1996 | Lin | 55/507 |

FOREIGN PATENT DOCUMENTS

| | | | |
|---|---|---|---|
| 268295 | 10/1929 | Italy | 55/492 |
| 52-61227 | 10/1993 | Japan | 55/DIG. 31 |

*Primary Examiner*—Duane S. Smith
*Attorney, Agent, or Firm*—Learman & McCulloch

[57] ABSTRACT

A filter support assembly (12) has a base (26) with a mounting surface (28), a rim member (34) with a flat surface (38) and post members (32) connecting the rim member to the base. Apertures (40) and the area surrounding by the rim member (34) provide air passages. One element (46) of a hook and loop connector (20) is attached to the mounting surface (28) on the base (26) by an adhesive. The other element (48) of the hook and loop connection (20) is secured to the wall (22) by an adhesive and surrounds the air inlet (50) to the housing (24). When the elements (46) and (48) are in engagement with each other, the filter support assembly (12) is secured to the housing (24) and a seal is formed between the base (26) and the wall (22) of the housing (24). A primary filter element (14) is removably secured to the surface (38) on the rim member (34). A side filter element (16) is removably secured to the support assembly (12) in a position covering the apertures (40).

12 Claims, 3 Drawing Sheets

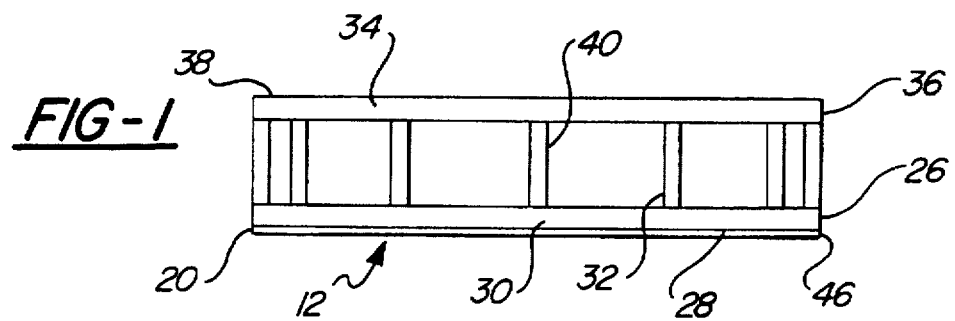
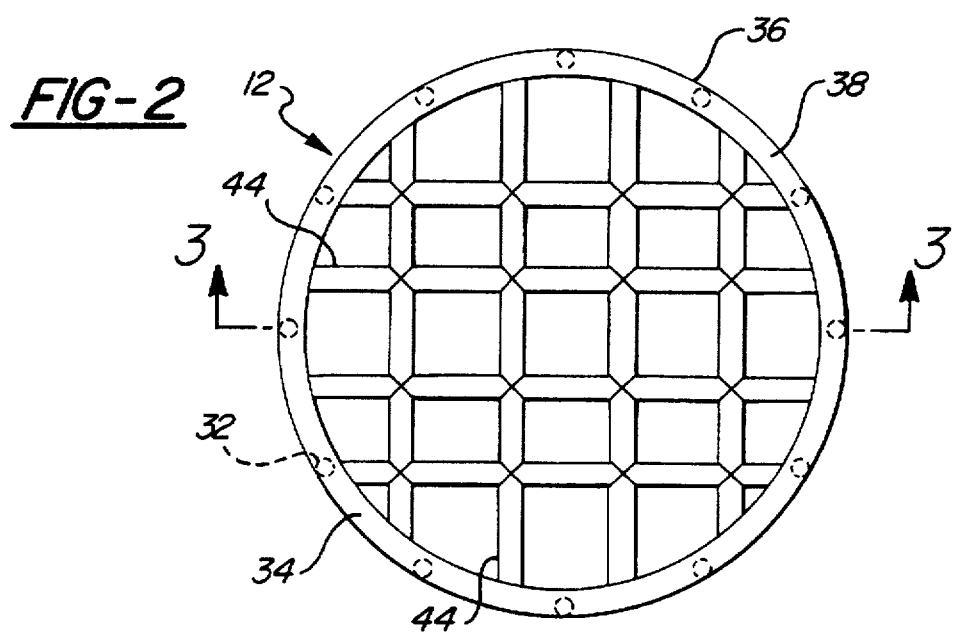
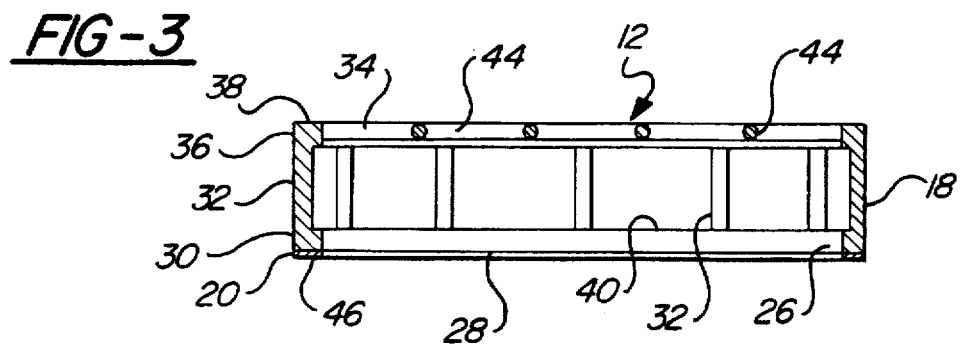
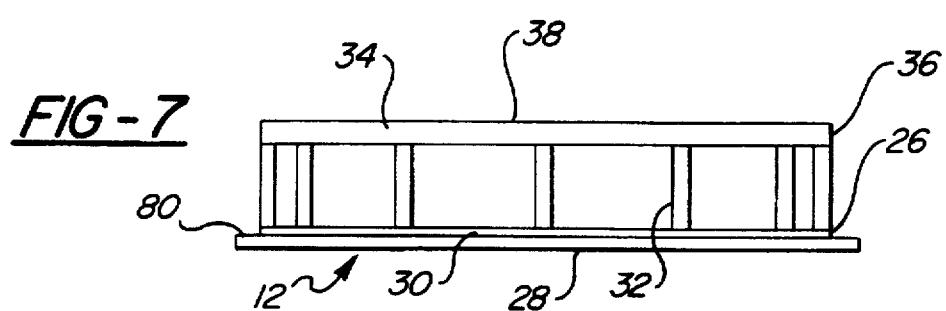

5,766,316

ELECTRONIC DEVICE COOLING AIR FILTER AND METHOD THEREOF

BACKGROUND OF THE INVENTION

This application claims the benefit of U.S. Provisional application Ser. No. 60/018,051, filed May 21, 1996, now abandoned.

1. Technical Field

This invention is in an air filter for cleaning cooling air for computers and other electronic devices and more particularly in an air filter that can be attached to existing electronic devices to filter cooling air that is pulled into a housing by a fan.

2. Description of the Prior Art

Large mainframe computers are placed in special rooms with temperature control and filtered air supply systems. The filtered air that enters these rooms cools the computer circuits and helps keep the special room clean. Air filtration and air temperature control systems for these rooms is elaborate and expensive. The high cost for air handling equipment is justified by the high cost of mainframe computers.

Today, most computers are personal computers. They are on desks in ordinary offices and in homes. These areas have carpets, window curtains, people entering and leaving and other activities that discharge air pollutants into the air. The air filter systems, for heating and cooling equipment that heats and cools offices and homes, removes substantial quantities of lint, fibers and dust from air but do not provide air that is as clean as the air supplied to mainframe computer rooms.

Personal computers, photocopy machines, fax machines and other electronic equipment, found in offices and homes today, are provided with air cooling systems. The air cooling systems include a fan driven by a fractional horse power motor. An air inlet opening, through which the fan pulls air, is provided in a housing for the electronic equipment. A grill of some type covers the cooling air inlet opening and keeps fingers, window curtains and other large articles out of the fan. The grill does not keep dust, lint, fibers, smoke and other small particle size pollutants from being sucked in by the fan. These pollutants tend to stick to the electronic components that are being cooled by the air.

Filters have been proposed that filter the air entering a special enclosure. A computer or other electronic device is then placed in the enclosure. Such filters can provide a clean environment for an electronic device. However, they have some serious limitations. Air circulation fans are required to move clean air through the filter and into the enclosure. The enclosures are large, bulky, heavy and the fan makes noise. Placing an electronic device in the enclosure may make it difficult or even impossible to use the electronic device while it is housed in the enclosure.

Foam filters that cover the cooling fan air intake grill of a computer device have also been proposed. The foam member is held in place by adhesive strips that contact the housing of the computer device at the edge of the grill. This filter solves some the problems mentioned above but creates new problems. The fans used to pull cooling air into the housings for computers and other electronic equipment are small, fractional horse power electric motors with attached fan blades. These motors will run for a long time if they are not overloaded. The air inlet grill provides sufficient area for air passage to ensure that the motor is not overloaded under normal conditions. Unfortunately, a filter element which is in contact with the grill provides an air inlet with the same inlet area as the grill. The filter material creates minimal resistance to air flow and a minimal increase in the load on the fan motor. Material which is filtered from the air by the foam filter tends to stick to the filter directly over the grill openings. The effective area of the filter with the filter material directly in contact with the grill is substantially less than the surface area of the foam filter. As a result, the resistance to air flow due to material filtered from the air plugging the filter occurs relatively quickly. This resistance to air flow can overload the fan motor and render the electronic device unusable.

SUMMARY OF THE INVENTION

An object of this invention is to provide a filter attachment that can be attached directly to the cooling air intakes of existing electronic equipment. Another object of the invention is to provide a filter attachment that accommodates a variety of filter material that can be replaced easily and quickly. A further object of the invention is to provide a filter assembly with an effective filter area that is substantially larger than the air inlet grill thereby reducing the resistance to air flow. A still further object of the invention is to provide a filter attachment having a large surface area substantially all of which passes air and filters out contaminants thereby providing long filter life and efficient air cleaning.

The filter attachment has a filter support assembly with a base mounting flange, a portion extending outward from the base and a flat primary filter support surface that is parallel to the base and spaced from the base. The base has one portion of a hook and loop connector attached by an adhesive. Another portion of the hook and loop connector is attached to the housing of an electronic device and surrounds the cooling air inlet opening and grill.

A primary filter element is attached, to the flat filter support surface on the rim member of the filter support assembly by an adhesive strip on the filter periphery. Filter strips are also attached to the portion extending outward from the base by an adhesive. After the filter elements are attached to the filter support assembly, the portion of the hook and loop connector attached to the base of the filter support assembly is moved into contact with the portion of the hook and loop connector that is attached to the electronic device housing. The filter assembly is then ready for use.

The filter support assembly is preferably made from a flexible plastic material that can be crushed if it is forced against an obstruction and that will spring back to its original shape once force is removed. The primary filter preferably has at least twice the area of the air intake opening in the electronic device housing. The filter support of the filter support assembly for the primary filter has sufficient stiffness to support a filter element spaced from the air inlet opening and the wall of the electronic device housing. If a primary filter element is employed that is made from a stiff material, support of the outer edges of the filter element by the filter support assembly is all that is required. The space between the wall of the housing and the primary filter attached to the filter support assembly forms a pressure equalization chamber that tends to equalize the pressure drop across the filter element and to minimize the pressure drop.

BRIEF DESCRIPTION OF THE DRAWINGS

Other advantages of the present invention will be readily appreciated as the same become better understood by reference to the following detailed description when considered in connection with the accompanying drawings wherein:

FIG. 1 is a top plan view of the filter support assembly;

FIG. 2 is a front elevational view of the filter support assembly;

FIG. 3 is a cross-sectional view taken along lines 3—3 in FIG. 2;

FIG. 7 is a top plan view of a filter support assembly with a retainer flange;

DETAILED DESCRIPTION OF THE BEST MODE OF CARRYING OUT THE INVENTION

Figure 5:
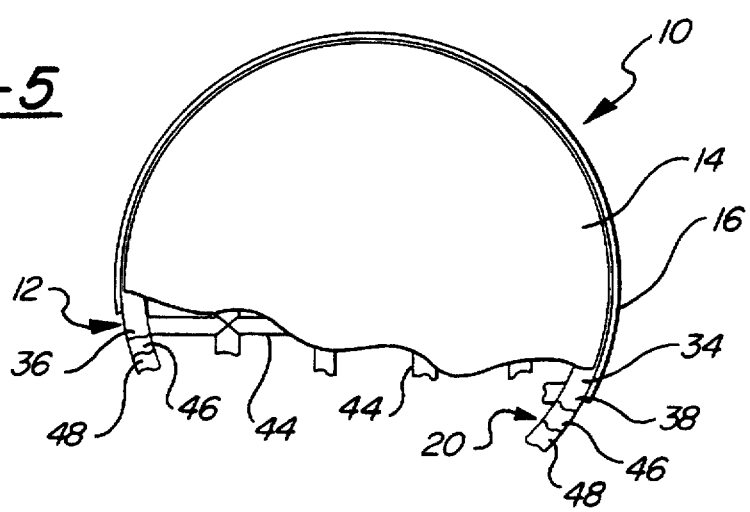
FIG. 5 is a side elevational view of the filter support assembly with filter elements attached and having parts broken away.

The filter attachment 10 as shown in FIG. 5 has a filter support assembly 12, a flat primary filter element 14 and side filter element 16. The side filter element 16 is optional and is used only if there are passages through the sides 18 of the filter support assembly 12. A hook and loop connector 20 secures the filter support assembly 12 to the wall 22 of a housing 24 for a computer or other electronic device.

The filter support assembly 12 has a base 26 with a flat surface 28. The base 26 also has a radially outward facing side surface 30. Post members 32 are integral with the base 26 and extend away from the flat surface 28. A rim member 34 with a radially outward facing side surface 36 and flat surface 38 is integral with the post members 32. Apertures 40 are defined by the post members 32, the base 26 and the rim 34. The apertures 40 are covered by a side filter element 16 that is secured to the side surface 30 and the side surface 36 by adhesive strips. All of the air that is pulled through the apertures 40 is filtered by the side filter element 16. If the side filter element 16 is not required, the post members 32 can be eliminated and the side surfaces 30 and 36 can be joined to form a continuous surface without apertures.

Figure 4:
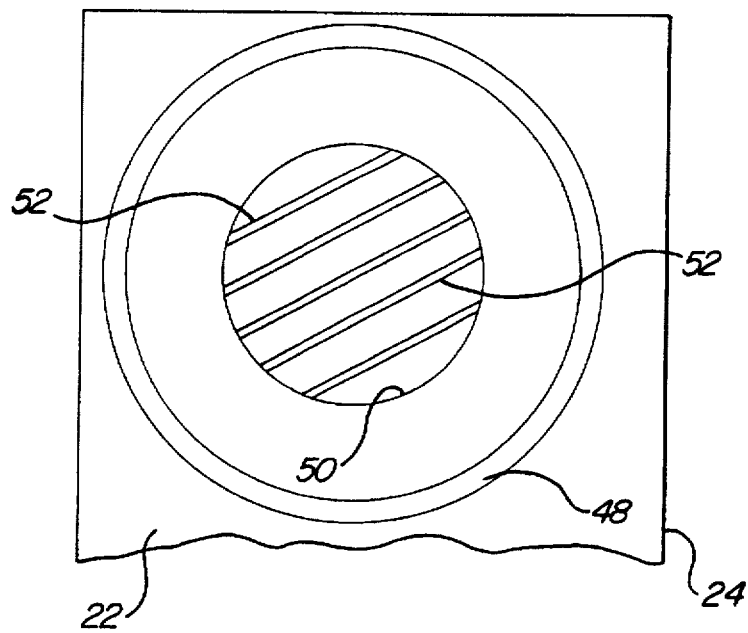
FIG. 4 is a side elevational view of a computer air intake grill and a portion of a computer rear wall.

The rim member 34 supports a plurality of integral cross members 44. The function of the cross members 44 is to support the primary filter element 14. The integral cross members 44 are narrow so that they do not significantly reduce air flow through the filter element 14. By supporting the filter element 14 spaced from a plane through the flat surface 28 of the base 26, a pressure equalization chamber is created that tends to equalize the air flow rate across the filter elements 14 and 16. The integral cross members 44 form a grid that preferably supports the primary filter element 14 in a flat plane thereby reducing stress on the filter element. The primary filter element 14 is secured to the flat surface 38 of the rim 34 by an adhesive strip. One element 46 of the hook and loop connector 20 is attached to the flat surface 28 of the base 26 by an adhesive. The other element 48 of the hook and loop connector 20 is attached to the wall 22 of the housing 24 by an adhesive as shown in FIG. 4.

An air inlet 50 into the housing 24 is covered by grill bars 52. The air inlet 50 is surrounded by the element 48 of the hook and loop connector 20. As shown in FIG. 4, the air inlet 50 is in the center of the area enclosed by the element 48. It is not necessary for the air inlet 50 to be in the center of the area enclosed by the element 48. However, it is desirable for the combined area of the filter elements 14 and 16 through which air passes to be substantially larger than the area of the air inlet 50. The larger area of the filter elements 14 and 16 reduces the pressure drop across the filter elements, reduces the velocity of air travel through the filters, improves filter efficiency and increases filter element life. As shown in FIG. 4, the area of the primary filter element 14 is about three times the size of the air inlet 50. If the side filter element 16 is included, the total filter area is substantially more than three times the area of the air inlet 50. The total filter area should be at least two times and preferably at least four times the area of the air inlet 50.

The primary filter element 14 and the side filter element 16, supported by the filter support assembly 12, can be made from a large variety of materials. Some of these materials produce rigid or semi-rigid filter elements. Other materials produce flexible filter elements. The filter support assembly 12 described above supports filter elements 14 and 16 that are flexible. If stiff or non-elastic filter elements 14 and 16 are used, the filter support assembly 12 can be simplified. The number of cross members 44 supporting the primary filter element 14 can be reduced or the cross members 44 can be eliminated. A primary filter element 14 is supported entirely by the flat surface 38 of the rim member 34 when the cross members 44 are eliminated. The number of post members 32 can also be reduced when the side filter element 16 is made from a non-elastic material. The number of post members 32 required to maintain a connection between the base 26 and the rim member 34 is all that is required.

The filter support assembly 12 as shown in the drawing is circular. The shape could be changed from circular to square, rectangular or other shape which would fit on the housing 24. For some electronic equipment housings 24, it may be necessary to provide a filter support assembly 12 having a special configuration to accommodate features of the housing. Generally, it is desirable to limit the size of the sides 18 of the filter support assembly 12 to about one-half inch or less, from the surface 28 on the base 26 to the flat surface 38 on the rim member 34, so that the equipment housing 24 can be stored in its usual place. If the overall size of the equipment housing 24 is increased too much when the filter attachment 10 is attached, it would be necessary to move the housing to a different location where sufficient space is available.

Although it is generally desirable to keep the sides 18 of the filter support assembly 12 under about one-half inch, thereby placing the primary filter element 14 close to the wall 22 of the housing 24, it may not be possible to obtain sufficient filter area without a large side filter element 16. When the air inlet 50 is large relative to the adjacent wall 22 of the housing 24, sufficient filter area can be obtained by increasing the size of the sides 18 thereby increasing the area provided by the apertures 40 and increasing the size of the side filter 16.

Figure 6:
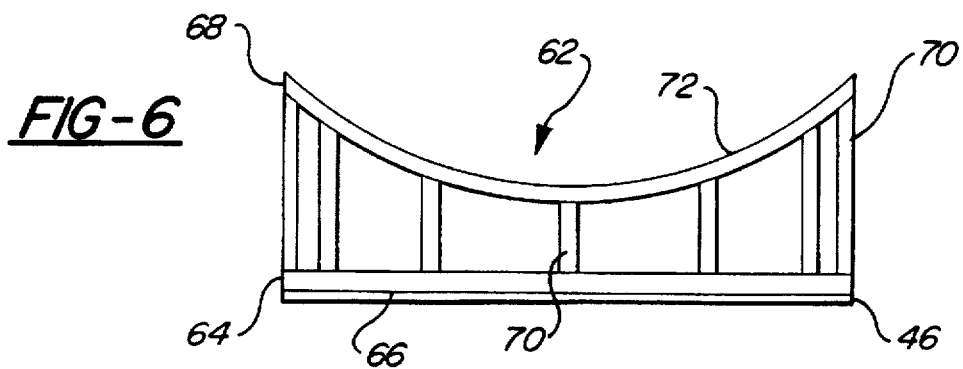
FIG. 6 is a top plan view similar to FIG. 1 of a modified filter support assembly.

A modified filter support assembly 62 is shown in FIG. 6. The modified filter support assembly 62 has a base 64 with a flat surface 66 that is identical to the base 26. A curved rim member 68 is connected to the base 64 by post members 70. The upper surface of the rim member 68 is a filter contact surface 72. The filter contact surface 72 as shown is a portion of the wall of a cylindrical bore. This shape increases the rigidity of the primary filter element 14 when it is attached to the contact surface 72 unless the filter element is stretchable. The shape also insures that the primary filter element 14 is not blocked when the housing 24 is positioned too close to a wall or other flat surface. Cross members, similar to the cross members 44 described above, can be employed with the rim member 68 to support the primary filter element 14 if desired. Such cross members would have to be shaped as required to be compatible with the shape of the rim member 68. The filter contact surfaces 38 and 72 can have shapes other than the ones shown in the drawing as long as the shape is compatible with the primary filter 14.

The primary filter element 14 and the side filter element 16 are preferably secured to the filter support assemblies 12 and 62 by adhesives as explained above. The filter elements 14 and 16 could also be held in place mechanically if desired.

Figure 8:
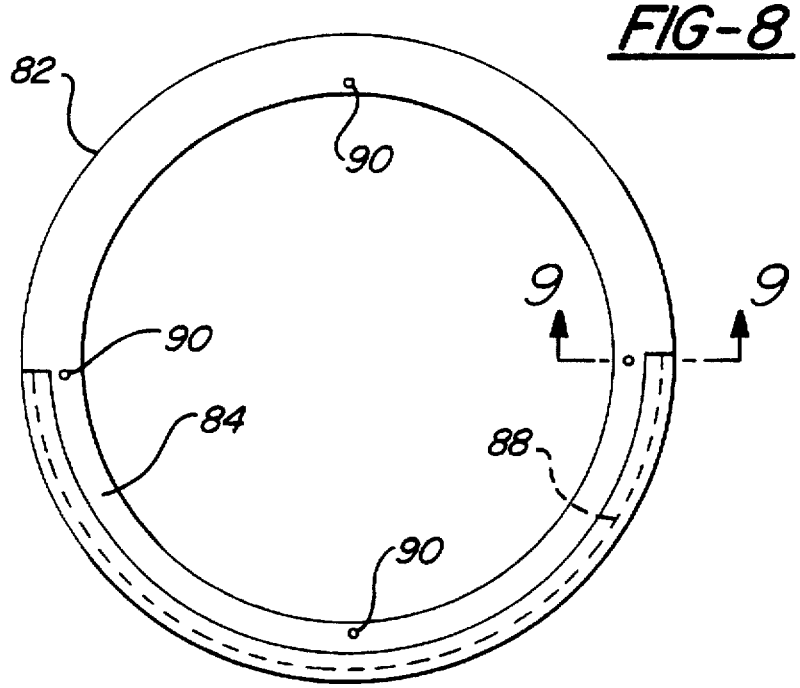
FIG. 8 is a front elevational view of a mounting ring.
Figure 9:
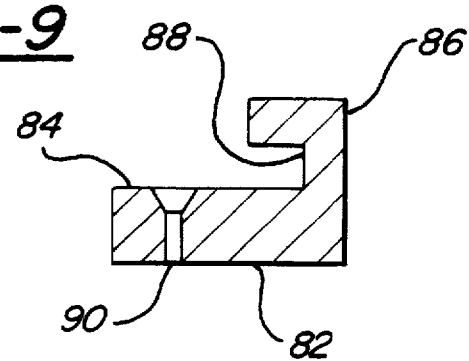
FIG. 9 is a sectional view taken along lines 9—9 in FIG. 8.

The filter support assembly 12 can be provided with a retainer flange 80 as shown in FIG. 7 for attachment to a housing 24. With this attaching system, the hook and loop connection 20 is not used and the one element 46 of the connector is not attached to the flat surface 28 on the base 26 of the filter support assembly. A mounting ring 82 shown in FIGS. 8 and 9 is attached to the wall 22 of the housing 24 by screws, adhesive, a hook and loop connector, or another holding system. Bores 90 for recessed screws are shown in FIGS. 8 and 9. The mounting ring 82 includes a filter support assembly contact surface 84. A flange 86 on the outer edge of the mounting ring 82 forms a groove 88. The groove 88 receives the retainer flange 80 on the filter support assembly 12 and holds filter support assembly in contact with the contact surface 84. The groove 88 is open on one side to allow removal of the filter support assembly 12 for maintenance. Mounting rings 82 can be designed to fit specific housings 24 and any filter support assembly 12 with a compatible retainer flange 80 can be used.

Figure 10:
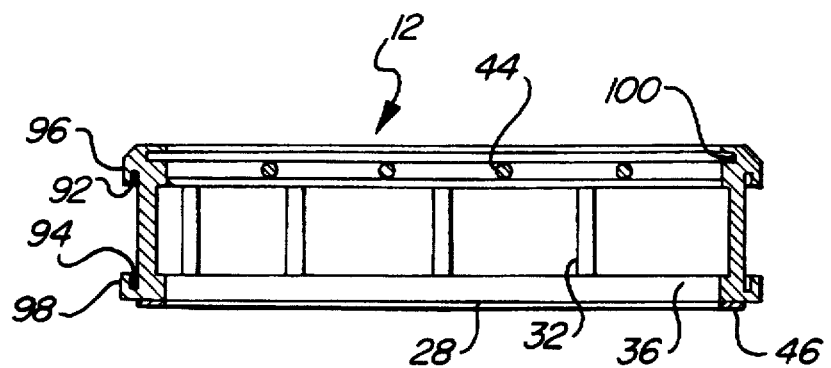
FIG. 10 is a sectional view similar to FIG. 3 of a filter support assembly with filter element retainer slots.

The filter support assembly 12 as shown in FIG. 10 is provided with a pair of grooves 92 and 94 for receiving and retaining a side filter element 16. The side filter element 16 is slid into and out of the grooves 92 and 94 through slots (not shown) in the flanges 96 and 98 on one side of the grooves.

The filter support assembly 12 as shown in FIG. 10 is also provided with a groove 100 for receiving and retaining the edges of a primary filter element 14. Suitable slots (not shown) are provided as required to make it easy to move a primary filter element 14 into or out of the groove 100. Adhesive strips are generally not employed on primary and side filter elements 14 and 16 when these filter elements are retained in the grooves 92, 94 and 100. The width of the grooves 92, 94 and 100 is sufficient to accommodate the thickness of the primary and side filter elements 14 and 16 that are used.

In operation the one element 46 of the hook and loop connector 20 is placed in contact with other element 48 or another retaining system is used to hold the filter support assembly 12 in place on the wall 22 of the housing 24. The primary filter element 14 is secured to the flat surface 38 of the rim member 34, to the filter contact surface 72 of the rim member 68, or by the groove 100. A filter element 16, if the filter support assembly 12 or 62 has side apertures 40, is secured to the side surfaces 30 and 36, to side surfaces 74 and 76, or by grooves 92 and 94. In this condition, all air pulled through the air inlet 50 must pass through the filter elements 14 and 16. An adhesive which may be used to attach the filter elements 14 and 16 to the filter support assembly 12 permits the filter elements to be peeled off and replaced by new filter elements when the originals are too dirty for continued use. This can be done with a filter support assembly 12 held on the housing 24 by the hook and loop connector 20 or another retaining system. However, if desired the filter support assembly 12 can be removed from the housing 24, cleaned, new filter elements 14 and 16 attached and then the support assembly can be reattached to the housing.

It is to be understood that other embodiments of the invention which accomplish the same function are incorporated herein within the scope of any ultimately allowed patent claims.

I claim:

1. An air filter attachment for a heat generating electronic device in a housing with walls, a cooling inlet in one of the walls and a fan to draw cooling air through the cooling air inlet and into the housing comprising:

a) a filter support assembly having a base, a mounting surface on the base, a rim member attached to the base, and a filter contact surface on the rim member;

b) a primary filter element releasably secured to the filter contact surface on the rim member; and c) a hook and loop retainer, with a first element secured to the housing and a second element secured to the base, retaining the mounting surface adjacent to the wall of the housing in a position in which the base surrounds the cooling air inlet and wherein the hook and loop retainer is disengagable with the primary filter element secured to the filter contact surface and the primary filter element is releasable from the filter contact surface with the filter support assembly retained adjacent to the wall of the housing.

2. An air filter attachment as set forth in claim 1 including cross members secured to the rim member and supporting the primary filter element.

3. An air filter attachment as set forth in claim 1 including post members connecting the base to the rim member and defining at least one aperture between the base and the rim member; and a secondary filter element releasably secured to the base and the rim member and covering an opening between the base and the rim member.

4. An air filter attachment as set forth in claim 1 wherein the filter support assembly forms a pressure equalizing chamber between the primary filter element and the cooling air inlet.

5. An air filter attachment as set forth in claim 1 wherein the filter support assembly is made from a flexible plastic material.

6. An air filter attachment as set forth in claim 1 wherein the primary filter element has an area that is at least twice the area of the cooling air inlet in a wall of the housing.

7. An air filter attachment as set forth in claim 1 wherein the filter contact surface on the rim is in a plane.

8. An air filter attachment as set forth in claim 1 wherein the filter contact surface on the rim is an arcuate surface.

9. An air filter attachment, for filtering cooling air entering a housing having a cooling air inlet, comprising:

a filter support assembly with a base, a mounting surface on the base, a rim member integral with and spaced from the base that defines a primary filter support inlet, and a continuous filter contact surface on the rim member; a retainer sealing between the mounting surface on the base and the housing and adapted to releasably secure the base of the filter support assembly to the housing in a position in which the base encircles the cooling air inlet; a primary filter element releasably secured to the filter contact surface on the rim member, and wherein the base is releasable from the housing with the primary filter element secured to the filter contact surface.

10. An air filter attachment as set forth in claim 9 wherein the base is connected to the rim member by integral post members, at least one air inlet aperture is formed between the base and the rim member and a secondary filter element is releasably secured to the filter support assembly and covers the at least one inlet aperture.

11. A method of filtering cooling air entering an electronic device housing through a cooling air inlet in the housing comprising:

a) attaching a first part of a hook and loop connector to the electronic device housing;

b) attaching a second part of a hook and loop connector to a mounting surface on a base of a filter support assembly;

c) moving the second part of the hook and loop connector into engagement with the first part of the hook and loop connector with the base of the filter support assembly surrounding the cooling air inlet in the housing and forming a seal between the mounting surface on the base of the filter support assembly and the electronic device housing; and d) attaching a primary filter element to a filter contact surface on a rim member of the filter support assembly which is integral with the base of the filter support assembly;

e) operating a cooling system of an electronic device in the electronic device housing to move air through the primary filter and through the cooling air inlet in the housing; and f) replacing the primary filter element with a clean primary filter element upon the primary filter element becoming covered with foreign material.

12. A method of filtering cooling air entering an electronic device housing as set forth in claim 11 including: attaching a secondary filter element to the filter support assembly in a position in which the aperture in the filter support assembly between the base and the rim member is covered by the secondary filter element.

* * * * *